March 30, 1954
M. V. HOOVER
2,673,952
DECOUPLING SYSTEM
Filed May 21, 1952
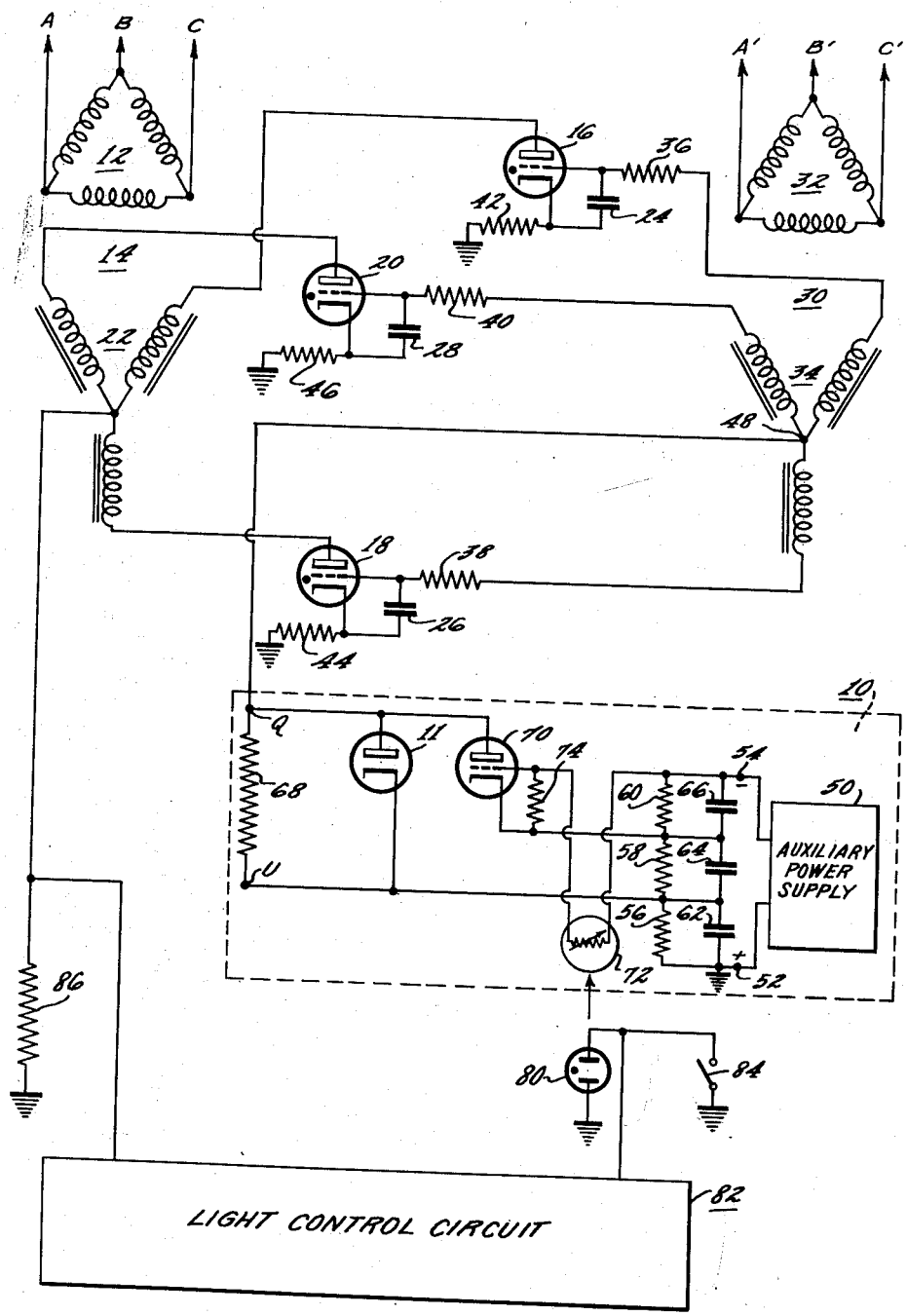
INVENTOR
Merle V. Hoover
BY
ATTORNEY Patented Mar. 30, 1954

2,673,952

UNITED STATES PATENT OFFICE 2,673,952

DECOUPLING SYSTEM

Merle V. Hoover, Mountville, Pa., assignor to Radio Corporation of America, a corporation of Delaware Application May 21, 1952, Serial No. 289,062

9 Claims. (Cl. 321—13)

This invention relates to decoupling systems, and has particular reference to polyphase rectifier systems employing grid controlled gaseous conduction tubes. While not limited thereto, the decoupling system of this invention is particularly applicable to the rectifier system disclosed in the copending patent application, Serial No. 285,207 filed April 30, 1952, by Merle V. Hoover, and assigned to the same assignee.

Grid controlled rectifier systems of the polyphase type employing gaseous conduction tubes, such as thyratrons and ignitrons, for example, are used to provide a high unidirectional voltage output with relatively high current demands. The high cost, circuit complexity, and spurious firing characteristics of these rectifier systems, however, have been the chief deterrents against their greater popularity. Since the cathodes of most of these gaseous conduction devices in practical applications usually operate at a positive D.-C. voltage with respect to ground at their load terminals, the interelectrode capacitance and other capacitances between the cathode and the grid cause a positive voltage to be coupled back into the grid conduction control system. In the vernacular of the art, this phenomenon is loosely referred to as "bootstrapping," a more complete description of which may be found by referring to pp. 120–124 and 138 of "Pulse Generators" by Glasoe and Lebacqz, volume V of MIT series produced for the OSRD and NDRC, published by the McGraw-Hill Book Company, in 1948. By the term "bootstrapping" as used herein, is meant the phenomenon whereby the voltage appearing across a cathode load resistor of a gaseous conduction device is coupled by various means to the grid in such a manner that this positive going voltage is coupled back into the rectifier blocking control system which is employed in the cyclical firing of grid controlled gaseous conduction tubes connected in a polyphase system. This "bootstrapping" in polyphase grid controlled rectifier systems may cause spurious firing of, or arc-back in, the gaseous rectifier tubes, resulting in faulty rectifier operation and the possibility of irreparable damage to the tubes. It is, therefore, an important object of this invention to provide a novel decoupling system for polyphase grid controlled rectifier systems.

Another object of this invention is to provide a novel decoupling system for polyphase grid controlled rectifier systems, which will prevent premature, or spurious firing of the rectifier tubes, and thereby prevent damage to, and insure proper operation of, the rectifier systems.

A further object of this invention is to provide a novel decoupling system which is simple and efficient in use as applied to polyphase rectifiers.

According to the invention, these and other objects and advantages are attained in a novel and highly efficient decoupling system for polyphase rectifier systems employing grid controlled gaseous conduction devices, as for example, thyratrons or ignitrons. In one embodiment of the invention, the novel decoupling system is used to decouple three thyratrons of a three phase, half-wave rectifier system. When the rectifier is unblocked, a blocking control system biases the grids of the thyratrons with a negative voltage of a magnitude smaller than the positive voltage pulses applied to these grids by an impulse transformer, thereby firing the thyratrons cyclically. The blocking control system is connected to the grids of the thyratrons through a resistor and the secondary of the impulse transformer. The decoupling system comprises a half-wave rectifier device, used as a dissipative diode, connected in shunt relationship with the resistor in such a manner that any voltages fed back through the rectifier system as a result of "bootstrapping" or other causes will permit the dissipative diode to become conductive, thereby acting as a low impedance to these fed back voltages. By this arrangement, the bias supplied by the blocking control system to the grids of the thyratrons is always a negative voltage with respect to the cathode, and any fed back voltage due to "bootstrapping" or other causes is dissipated by the half-wave rectifier device before the fed back voltage can trigger another thyratron and cause it to fire prematurely. The dissipative diode device may take any form of known diode, depending on the voltages, speed of reaction and other design characteristics desired.

A more complete understanding of the invention may be had from the following description when read in connection with the accompanying drawing of which the single figure is a schematic circuit diagram of an illustrative embodiment thereof.

Referring to the drawing, there is shown a three phase, half-wave rectifier system employing a blocking control system 10, included within the dashed rectangle, and including a decoupling device, illustrated as a diode tube 11, in accordance with the invention. Three phase power ABC from a suitable source (not shown) is applied to the delta-connected primary 12 of a transformer 14. Transformed three phase power is applied to the anodes of gaseous conduction devices, or tubes 16, 18 and 20 by the secondary legs of the Y-connected secondary 22 of the transformer 14. The gaseous conduction tubes 16, 18 and 20 may be thyratrons, as illustrated, or ignitrons. Small capacitors 24, 26 and 28 are connected between the cathode and grid of each of the tubes 16, 18 and 20, respectively, in order to stabilize the spurious conduction characteristics of these tubes as is well known to those practiced in the art of thyratron application engineering.

In order to cyclically fire the tubes 16, 18 and 20, there is provided an impulse transformer 30, commonly known as a peaking transformer. Three phase power A'B'C' is supplied to the delta-connected primary 32 of the transformer 30, usually from some type of phase-shift device (not shown) in order to provide phase-shift control of the voltage output from the rectifiers 16, 18 and 20 in a manner well known to those skilled in the art. Each of the secondary legs of the Y-connected secondary 34 of the impulse transformer 30 is connected to a grid of the tubes 16, 18 and 20 respectively, through resistors 36, 38 and 40. These resistors 36, 38 and 40 serve to limit the peak grid currents when the grids of the tubes 16, 18 and 20 are driven positive in order to establish the conduction of current through these tubes, as when they are fired.

In the accompanying figure, the cathodes of the tubes 16, 18 and 20 have been connected to individual load resistors 42, 44 and 46, respectively. These load resistors 42, 44 and 46 may, for example, represent the loads presented by the ignitors of ignitrons when the thyratrons 16, 18 and 20 are applied to the ignitor conduction control of the ignitrons. These load resistors 42, 44 and 46 may also represent the loads presented by cyclically fired spot-welders under the control of the thyratrons 16, 18 and 20. Although its use it not limited to this type of thyratron connection, the advantages of the invention are more apparent when they are explained in conjunction with a system which is most adversely affected by voltages fed-back due to "bootstrapping." It should be noted that the summation of the grid currents due to thydratrons 16, 18 and 20 flow from the neutral 48 of the secondary winding 34 of the transformer 30, through resistors 68 and 56 to ground. For purposes of discussion, let it be assumed that the thyratron 16 has become conductive, thereby developing a positive going voltage across resistor 42 of such a magnitude that its peak value is practically that of the leg voltage of the secondary winding 22 of the transformer 14. The grid-cathode capacitance of thyratron 16 and the capacitance of the capacitor 24 couple this positive going voltage onto the grid circuit of the thyratron 16. Furthermore, the grid of thyratron 16 would practically assume the potential of the cathode electrode without the influence of these capacitances, since the arc-drop between grid and cathode of a gaseous conduction device is usually only a relatively few volts after the gaseous conduction has become well established. This positive going fed back voltage will now develop positive going differences of potential across the resistor 36, across the upper right leg of the secondary 34 of the transformer 30, and across the resistors 68 and 56. The magnitude of these positive going voltage drops will be dependent upon the impedances of the respective elements. The seriousness of this fed back voltage may be appreciated when it is realized that the neutral 48 of the secondary 34 of the transformer 30 becomes a positive going point as voltage is fed back from the upper end of resistor 42. The positive going voltage at the neutral 48 will tend, for example to drive the thyratron 18 to conduction prematurely. The thyratron 20 may well be in its inverse portion of the cycle at this instantaneous time and the positive going voltage at the neutral 48 would tend to make its grid circuit conductive with the consequence that arc-back may well occur. It should be evident that malfunction will result if corrective measures are not applied to prevent the neutral 48 from going too far in a positive direction.

There is another and more obscure phenomenon associated with gaseous conduction devices whereby the neutral 48 may assume a positive potential. This is known as the grid spike problem and has been discussed on p. 350 of the aforementioned Glasoe and Lebacqz reference. This phenomenon has been described by H. Heines, p. 96, Electronics, v. 19. No. 7, July, 1946, and by M. Givens, p. 533, Rev. of Sci. Inst., v. 22, No. 7, July, 1951. When a gaseous conduction device is being rendered conductive, the anode-grid space breaks down with a very short delay. As a result of this breakdown, the grid is momentarily raised to a high positive potential, falling back to a potential equal to the cathode potential plus the normal grid-cathode drop in a time comparable to the thyratron ionization time. Thus, the anode-grid breakdown momentarily may raise the grid circuit to a very high positive potential and a positive going spike will appear at the neutral 48 with the deleterious consequences mentioned in the previous paragraph. The decoupling device 11 described herein provides a means whereby the neutral 48 is restrained from assuming a positive potential with respect to ground.

The rectifier blocking control system 10 will now be described. The purpose of the rectifier blocking control system 10 is to provide "on-off" control for the rectifier circuit. This is accomplished by applying a relatively small negative voltage to the grids of the tubes 16, 18 and 20 with respect to their cathodes during the unblocked condition, and a relatively greater negative voltage to these grids during the blocked condition. The rectifier blocking control system 10 comprises an auxiliary unidirectional power supply 50 having a positive output terminal 52 and a negative output terminal 54. A voltage divider comprising the resistors 56, 58 and 60, connected in series with each other, is connected across the terminals 52 and 54 of the auxiliary power supply 50. Filter capacitors 62, 64 and 66 are connected across the resistors 56, 58 and 60, respectively. The positive terminal 52 of the auxiliary power supply 50 is connected to ground. The neutral 48 of the Y-connected secondary 34 of the impulse transformer 30 is connected to the junction between the resistors 56, 58 through the resistor 68 for the purpose appearing hereinafter. Under normal operating conditions, the operating bias, or the negative voltage between the grid and the cathode of the tubes 16, 18 and 20 is supplied by the voltage drop across the resistor 56 and filtered of excess ripples by the capacitor 62. For the purposes of practical discussion, let this operating bias be —20 volts, thereby providing cut-off bias for the thyratrons 16, 18 and 20. Let it further be assumed that the positive going voltage output of the impulse transformer 30 is 30 volts. Thus, as the transformer 30 secondary 34 leg voltages cyclically become positive the tubes 16, 18 and 20 will be cyclically rendered conductive since the —20 volt cut-off bias is being overcome by the +30 volt impulse resulting in a net positive voltage of 10 volts.

In order to block the rectifier system, that is to stop the cyclical conduction of the tubes 16, 18 and 20, the blocking control system must develop a negative voltage of sufficient magnitude such that the impulse from the transformer 30 secondary 34 is unable to overcome it. If, for example, a voltage of —70 volts is developed from the neutral 48 to ground, the 30 volt positive impulse will be unable to establish conduction in the tubes 16, 18 and 20. To this end, there is provided a control tube 70 having an anode connected to the neutral 48 of the Y-connected secondary 34 of the transformer 30, and a cathode connected to the junction of the resistors 58 and 60. A control grid of the tube 70 is connected to the negative terminal 54 of the auxiliary power supply 50 through a photoelectric cell 72. The photoelectric cell 72 is of the type which provides a very high impedance to the flow of an electric current when no light is falling upon it, and a very low impedance when it is activated by a beam of light. A bias resistor 74 is connected between the grid and the cathode of the control tube 70. The plate load resistance for control tube 70 is provided by the resistance 68. The ultimate function of the control tube 70 as hereinafter described is to develop a potential of, for example, 50 volts across the resistor 68 with a polarity such that the rectifier system will be blocked. Thus, this —50 volts is additive with the aforementioned +20 volts across resistor 56, resulting in a total of —70 volts with a resultant blocking of the rectifier system.

In order to prevent spurious conduction, due to "bootstrapping" or the grid spike problem aforementioned, in a grid controlled rectifier of the type described, the diode tube 11 is connected across the resistor 68. The anode of the diode 11 is connected to a point Q between the neutral of the secondary 34 of the transformer 30 and the resistor 68, and the cathode of the diode 11 is connected to a point U between the resistor 68 and the junction between the resistors 56, 58.

For the purpose of illustration, let it be assumed that the rectifier control system is unblocked and the tube 16 is the first to be fired. The cathode of the tube 16 rises from zero potential to a high positive potential. As a consequence of the "bootstrapping" mentioned above, or as a consequence of the grid spike problem, the grid of the tube 16 will also have a high positive potential impressed upon it. This high positive potential is fed back to the point Q through the resistor 36, and the secondary 34 of the transformer 30. Under these conditions, the anode of the diode 11 is more positive than its cathode, and the diode 11 becomes conductive and presents a very low impedance across the resistor 68, and thereby prevents the point Q from becoming appreciably more positive than the point U. It should be noted that for normal operation of the rectifier system the point U must be more positive than the point Q, or stated conversely, in normal operation the point Q must always be negative with respect to the point U. Consequently, the presence of the diode 11 does not interfere with the normal operation of the blocking control system. It should also be realized that unless the positive impulse from the grid of the tube 16 is dissipated, as by the diode 11, it may prematurely fire the tube 18, the next tube to be fired cyclically, and thus cause faulty operation of, and possible damage to, the rectifier system as described above. It is obvious to those skilled in the art that the diode 11 may take the form of a hot-cathode device, cold-cathode device, selenium or germanium diode, depending on the voltages, speed of reaction, and other design characteristics required or desired.

In order to control the impedance of the photoelectric cell 72 and thereby control the bias of the control tube 70, there is provided a light source 80 juxtaposed directly opposite the photoelectric cell 72. The light source 80 should be preferably a device in which the build-up and the decay characteristics are substantially instantaneous. Neon or argon gaseous tubes, glow discharge modulator tubes similar to those employed in facsimile system, or fluorescent screen light sources such as the kinescope or oscillograph tubes are suitable for the light source 80. Incandescent light or other types of light sources with inherent appreciable build-up or decay characteristics are not generally considered satisfactory because they delay the speed of response.

The light source 80 has one terminal connected to ground, and another terminal connected to a light control circuit 82, and to ground through a switch 84. The light control circuit 82 is connected to the neutral of the Y-connected secondary 22 of the transformer 14, and to ground through a resistor 86. The light control circuit 82 comprises means to supply a filtered unidirectional voltage for the light source 80, and means to extinguish automatically the light source 80 in response to a fault in the load resistances 42, 44 and 46, as described in the inventor's copending patent application, Serial No. 285,207, filed on April 30, 1952. This, however, is not directly a part of the present invention and further description of the light control circuit is deemed unnecessary to a complete understanding of the decoupling device.

The operation of the rectifier control system will now be described. In order to unblock the rectifier system, the switch 84 is opened and the light source 80 is lighted. When a beam of light from the light source 80 impinges upon the photoelectric cell 72, the latter becomes conductive. The voltage across the resistor 60 will then cause current to flow through the resistor 74 in such a direction as to develop a bias which will cut-off the control tube 70. Under these conditions current will not flow in the anode-cathode circuit of the control tube 70 and the voltage applied between the neutral of the Y-connected secondary 34 of the impulse transformer 30 and the cathodes of the tubes 16, 18 and 20 will be the relatively small negative voltage across the resistor 56, this being —20 volts in the aforementioned example. This negative voltage, the normal operating bias for the tubes 16, 18 and 20, may be overcome by the positive voltage pulses produced in the secondary 34 of the impulse transformer 30 to cyclically fire the tubes 16, 18 and 20. Under these conditions, the rectifier system is unblocked. Any attempt by the rectifier system to fire a thyratron out of its cyclical order, as a result of a voltage due to "bootstrapping" or the grid spike problem, is thwarted by the diode 11 as has already been described. The tendency for the rectifier system to malfunction as a consequence of the "bootstrapping" problem or the grid spike problem is particularly serious when the resistance of the resistor 68 is appreciable. The value of the resistor 68, however, is dependent on the power handling demands of the control tube 70, among other variables. Since the anode of the diode 11 is connected to the point Q and the cathode of the diode 11 is connected to the point U, the diode 11 will become conductive whenever the point Q becomes more positive than the point U and thus dissipate the fed back energy which would attempt to fire the other thyratrons prematurely. The diode 11 acts as a very low impedance to the fed back voltages and as an open circuit, or an infinite impedance, to the bias developed across resistor 68 by the blocking control system 10. It should be noted that the increment of the positive going voltage fed back and appearing across the resistor 56 will be relatively low because the impedance observed across the resistor 56 is relatively low, this resistor being bypassed by the capacitor 62 which will present a relatively low impedance path to grid spikes and other surges being fed back. The fed back voltages developing potential drops assume paramount importance only across those circuit elements, resistors 56, 58 which are common to the grid circuits of the three thyratrons 16, 18 and 20.

In order to block the rectifier system, the light source 80 is extinguished by closing the switch 84. In the absence of light, the photoelectric cell 72 becomes a substantially infinite impedance, thereby removing the bias on the control tube 70 such that the latter will now operate under substantially zero bias. Under this latter condition, current will flow in the anode-cathode circuit of the control tube 70 producing a drop in voltage across the load resistor 68. In the aforementioned example this voltage magnitude was —50 volts, which when added in series with the —20 volts across the resistor 56 develops a total bias voltage at the neutral 48 of —70 volts, this being of sufficient magnitude such that the positive voltage pulses produced in the Y-connected secondary 34 of the impulse transformer 30 are no longer able to overcome it and, consequently, the tubes 16, 18 and 20 will cease firing and remain blocked.

There has been described herein, in accordance with the objects of this invention, a decoupling system for decoupling the grid controlled gaseous conduction tubes of a polyphase rectifier system in order to prevent spurious firing of the gaseous tubes, resulting from the phenomena of "bootstrapping" and the grid spike problem. In essence, the decoupling system comprises means including a diode dissipator connected across a resistor in circuit with a blocking control system for applying a bias to the grids of the gaseous tubes. The diode is connected in such a manner that it acts as a low impedance to fed back voltages and as an infinite impedance to the biasing voltages applied to the gaseous tubes by the blocking control system.

Although the decoupling system described herein has been described in connection with a three phase, half-wave grid controlled rectifier system, it is applicable to substantially all other forms of grid controlled rectifier systems; and it shall be understood that the invention is not limited to the particular embodiment above-described and disclosed, but that changes and modifications may be made within the spirit of the invention.

What is claimed is:

1. The combination, with a rectifier system comprising a plurality of grid controlled gaseous conduction tubes, means to fire said tubes cyclically, and means to unblock and block said rectifier system, of a decoupling system adapted to decouple said tubes, said decoupling system being in circuit with said unblocking and blocking means and said firing means, said firing means comprising an impulse transformer having secondary legs each of which has an end connected to a grid of one of said tubes respectively, said blocking and unblocking means comprising a unidirectional power supply, and said decoupling system comprising a resistor, and a diode connected in shunt with said resistor and in series with said secondary legs and said power supply.

2. In a polyphase rectifier system of the type comprising a plurality of grid controlled gaseous conduction tubes, blocking and unblocking control means comprising a unidirectional power supply to apply a bias to the grids of said tubes, and an impulse transformer comprising a secondary connected to said grids for cyclically firing said tubes, a decoupling system comprising a resistor in series with said power supply and said secondary, and a diode connected across said resistor.

3. A polyphase rectifier system of the type defined in claim 2 wherein said diode comprises a low impedance to electrons flowing therethrough from the power supply to said secondary and a high impedance to electrons flowing in the opposite direction.

4. A polyphase rectifier system of the type defined in claim 2 wherein said diode comprises an anode and a cathode, said anode being connected to said secondary, and said cathode being connected to said power supply.

5. A polyphase rectifier system of the type defined in claim 2 wherein said diode comprises a cold-cathode device connected in a manner to conduct electrons away from said power supply.

6. A polyphase rectifier system of the type defined in claim 2 wherein said diode comprises a selenium diode connected in a manner to conduct electrons away from said power supply.

7. A polyphase rectifier system of the type defined in claim 2 wherein said diode comprises a germanium diode connected in a manner to conduct electrons away from said power supply.

8. In a polyphase rectifier system comprising a plurality of gaseous conduction tubes each of which has an anode, a grid, and a cathode, means to apply a positive voltage to said grids to cyclically fire said tubes, said means comprising a Y-connected secondary having legs connected to said grids, a blocking control system comprising means to apply a bias between said grid and cathode of each tube, said last-mentioned means comprising an auxiliary unidirectional power supply, and a voltage divider across said power supply; a decoupling system for decoupling said tubes from each other comprising a resistor connected between the neutral of said Y-connected secondary and an intermediate point on said voltage divider, and a half-wave rectifier connected across said resistor in a manner adapted to conduct electrons from said power supply toward said secondary.

9. A polyphase rectifier system of the type defined in claim 8 wherein said half-wave rectifier comprises a diode having an anode and a cathode, said anode being connected to the neutral of said Y-connected secondary, and said cathode being connected to said intermediate point on said voltage divider.

MERLE V. HOOVER.

References Cited in the file of this patent

UNITED STATES PATENTS

| Number | Name | Date |
|---|---|---|
| 2,015,537 | Silverman | Sept. 24, 1935 |
| 2,133,850 | Demontvignier | Oct. 18, 1938 |
| 2,196,413 | Gulliksen | Apr. 9, 1940 |